US 6,293,587 B1

(12) United States Patent
Lapic et al.

(10) Patent No.: US 6,293,587 B1
(45) Date of Patent: Sep. 25, 2001

(54) VEHICLE BODY AND FRAME ASSEMBLY INCLUDING ENERGY ABSORBING STRUCTURE

(75) Inventors: Stephen M. Lapic, Shillington; Andrew R. Simboli, Coatesville, both of PA (US); Kenneth J. Bonnville, Peoria, AZ (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/527,976

(22) Filed: Mar. 17, 2000

(51) Int. Cl.[7] .............................. B60R 19/34; B62D 21/15
(52) U.S. Cl. ..................... 280/784; 296/189; 293/133; 188/377
(58) Field of Search ........................ 180/232; 280/784; 296/189; 293/133; 188/371, 377

(56) References Cited

U.S. PATENT DOCUMENTS

| 3,146,014 | * | 8/1964 | Kroell | 293/133 |
|---|---|---|---|---|
| 3,599,757 | * | 8/1971 | Takamatsu et al. | 188/371 |
| 3,794,348 | | 2/1974 | Fischer . | |
| 3,795,410 | | 3/1974 | Huber . | |
| 3,998,485 | * | 12/1976 | Ptter et al. | 293/133 |
| 4,181,198 | * | 1/1980 | Lindberg | 293/133 |
| 4,257,581 | | 3/1981 | Keeler, II . | |
| 4,413,840 | | 11/1983 | Shah . | |
| 4,684,151 | * | 8/1987 | Drewek | 280/784 |
| 5,224,574 | * | 7/1993 | Thum | 188/371 |
| 5,293,973 | | 3/1994 | Thum . | |
| 5,314,229 | | 5/1994 | Matuzawa et al. . | |
| 5,431,445 | * | 7/1995 | Wheatley | 280/784 |
| 5,566,777 | | 10/1996 | Trommer et al. . | |
| 5,630,622 | | 5/1997 | Kirschenmann et al. . | |
| 5,876,077 | * | 3/1999 | Miskech et al. | 296/189 |
| 6,189,941 | * | 2/2001 | Nohr | 188/371 |

FOREIGN PATENT DOCUMENTS

| 195 11 867-C1 | * | 5/1996 | (DE) . |
| 0794350-A1 | * | 9/1997 | (EP) . |
| 410007025-A | * | 1/1998 | (JP) . |
| 02000053017-A | * | 2/2000 | (JP) . |

* cited by examiner

Primary Examiner—Lanna Mai
Assistant Examiner—Ruth Ilan
(74) Attorney, Agent, or Firm—MacMillan, Sobanski & Todd, LLC

(57) ABSTRACT

A vehicle frame assembly has an energy absorbing structure including a first portion having a first generally uniform dimension. A second portion extends from the first portion and has a second generally uniform dimension that is greater than the first generally uniform dimension of the first portion, thereby defining a first shoulder between the first portion and the second portion. A third portion extends from the second portion and has a third generally uniform dimension that is less than the first generally uniform dimension of the first portion, thereby defining a second shoulder between the second portion and the third portion. The second portion has at least one stiffening rib formed therein. The third portion has at least one stiffening rib formed therein that is discontinuous with the stiffening rib formed in the second portion. The energy absorbing structure is adapted to be deformed during a collision such that the third portion is moved within the second portion to absorb energy.

7 Claims, 7 Drawing Sheets

VEHICLE BODY AND FRAME ASSEMBLY INCLUDING ENERGY ABSORBING STRUCTURE

BACKGROUND OF THE INVENTION

This invention relates in general to body and frame assemblies for vehicles. More specifically, this invention relates to an improved structure for such a vehicle body and frame assembly that includes a structure that is capable of absorbing energy in a controlled manner during a collision, thereby providing additional safety to the occupants of the vehicle.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design portions of the vehicle body and frame assembly so as to be at least partially collapsible during a collision so as to absorb to energy. To accomplish this, it is known to form such portions of the vehicle body and frame assembly to have corrugated or similarly deformed shapes that are somewhat weaker than the other non-deformed portions of the vehicle body and frame assembly. During a collisions, such deformed portions are designed to be the first portions of the vehicle body and frame assembly that are axially collapsed. Thus, the absorption of energy during a collision occurs in a somewhat controlled manner. A variety of such pre-deformed axially collapsible vehicle body and frame assembly structures are known in the art. Nonetheless, it would be desirable to provide an improved structure for a vehicle body and frame assembly including a structure that is capable of absorbing energy in a controlled manner during a collision, thereby providing additional safety to the occupants of the vehicle. In particular, it would also be desirable to provide such an energy absorbing structure that is replaceable after a collision.

SUMMARY OF THE INVENTION

This invention relates to a vehicle frame assembly including a structure that is capable of absorbing energy in a controlled manner during a collision, thereby providing additional safety to the occupants of the vehicle. The vehicle frame assembly can include a pair of longitudinally extending side rails having a plurality of transverse cross members extending therebetween. One or more energy absorbing structures can be provided at the front end of each of the side rails or elsewhere on the vehicle frame assembly. In a first embodiment, the energy absorbing structure includes a hollow nose cap that is secured to the front end of the side rail. The nose cap includes a first portion that is received telescopically with the front end of the side rail and a second portion that extends from the first portion. The second portion of the nose cap is preferably formed integrally with the first portion and has an outer size that is larger than the outer size of the first portion so as to define a first shoulder therebetween. The nose cap further includes a third portion that extends from the second portion and has an outer size that is somewhat smaller than the inner size of the second portion so as to define a second shoulder therebetween. If a relatively large force is exerted against the outermost end of the third portion of the nose cap, the second shoulder will bend, allowing the third portion of the nose cap to move telescopically inwardly relative to the second portion. Such bending of the second shoulder and concurrent telescopic movement of the third portion within the second portion absorbs energy from the collision. In a second embodiment, the energy absorbing structure includes a first portion that is formed integrally with the front end of the side rail and a second portion that extends therefrom. The second portion is preferably formed having an outer size that is somewhat smaller than the inner size of the first portion so as to define a shoulder therebetween. In a third embodiment, the energy absorbing structure includes a first hollow member that is received telescopically with the front end of the side rail in engagement with one or more inwardly extending first tabs formed thereon. Similarly, a second hollow member is received telescopically with the first hollow member in engagement with one or more inwardly extending second tabs formed thereon. If a relatively large force is exerted against the outermost end of the second member, the tabs will bend, allowing the second member to move telescopically inwardly relative to the first member and the first member to move telescopically inwardly relative to the front end of the side rail. Such bending of the tabs and concurrent telescopic movement of the members absorbs energy from the collision.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
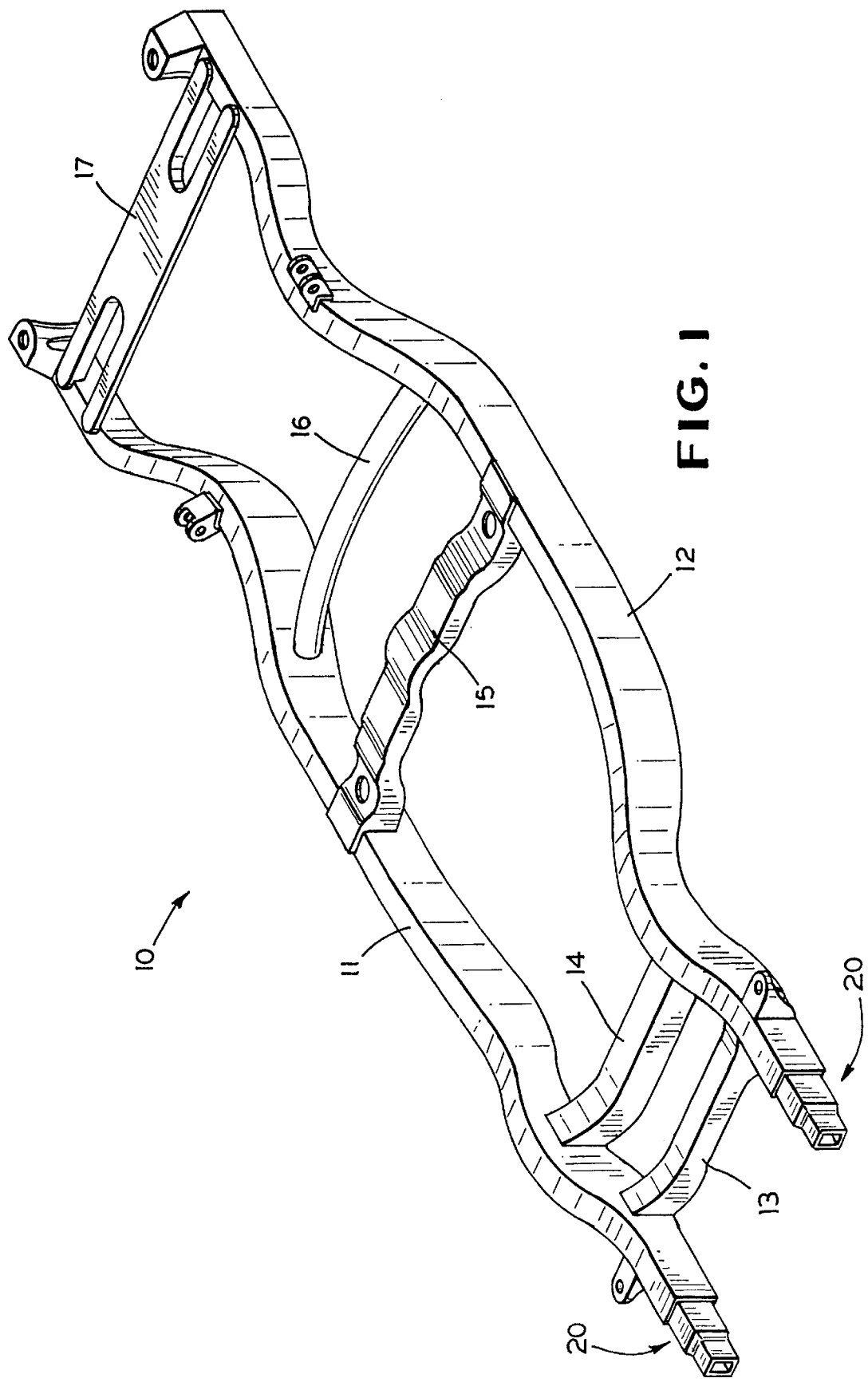
FIG. 1 is a perspective view of a vehicle frame assembly including a first embodiment of an energy absorbing structure in accordance with this invention.

Referring now to the drawings, there is illustrated in FIG. 1 a portion of a first embodiment of a vehicle body frame assembly, indicated generally at 10, in accordance with this invention. The vehicle frame assembly 10 is generally conventional in the art, and only those portions thereof that are necessary for a complete understanding of this invention will be described and illustrated. Furthermore, it will be appreciated that the illustrated vehicle frame assembly 10 is intended to be representative of any conventional structure, separate or unitized, for a frame assembly for use in a vehicle. The illustrated vehicle frame assembly 10 is a ladder frame assembly including a pair of longitudinally extending side rails 11 and 12 or similar structural members having a plurality of transverse cross members 13, 14, 15, 16, and 17 extending therebetween. The side rails 11 and 12 extend longitudinally throughout the entire length of the assembly 10 and are generally parallel to one another. Each of the side rails 11 and 12 in the illustrated embodiment is formed from a single closed channel structural member. However, it will be appreciated that one or both of the side rails 11 and 12 may be formed from a plurality of individually formed closed channel structural members that are secured together by any conventional means, such as by welding, riveting, bolting, and the like. Furthermore, portions of the side rails 11 and 12 may be formed from open channel structural members if desired.

The cross members 13 through 17 extend generally perpendicular to the side rails 11 and 12 and may be formed having any conventional structure. The cross members 13 through 17 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 17 provide lateral and torsional rigidity to the ladder frame assembly 10. The structure of the vehicle body and frame assembly thus far described is conventional in the art.

Figure 2:
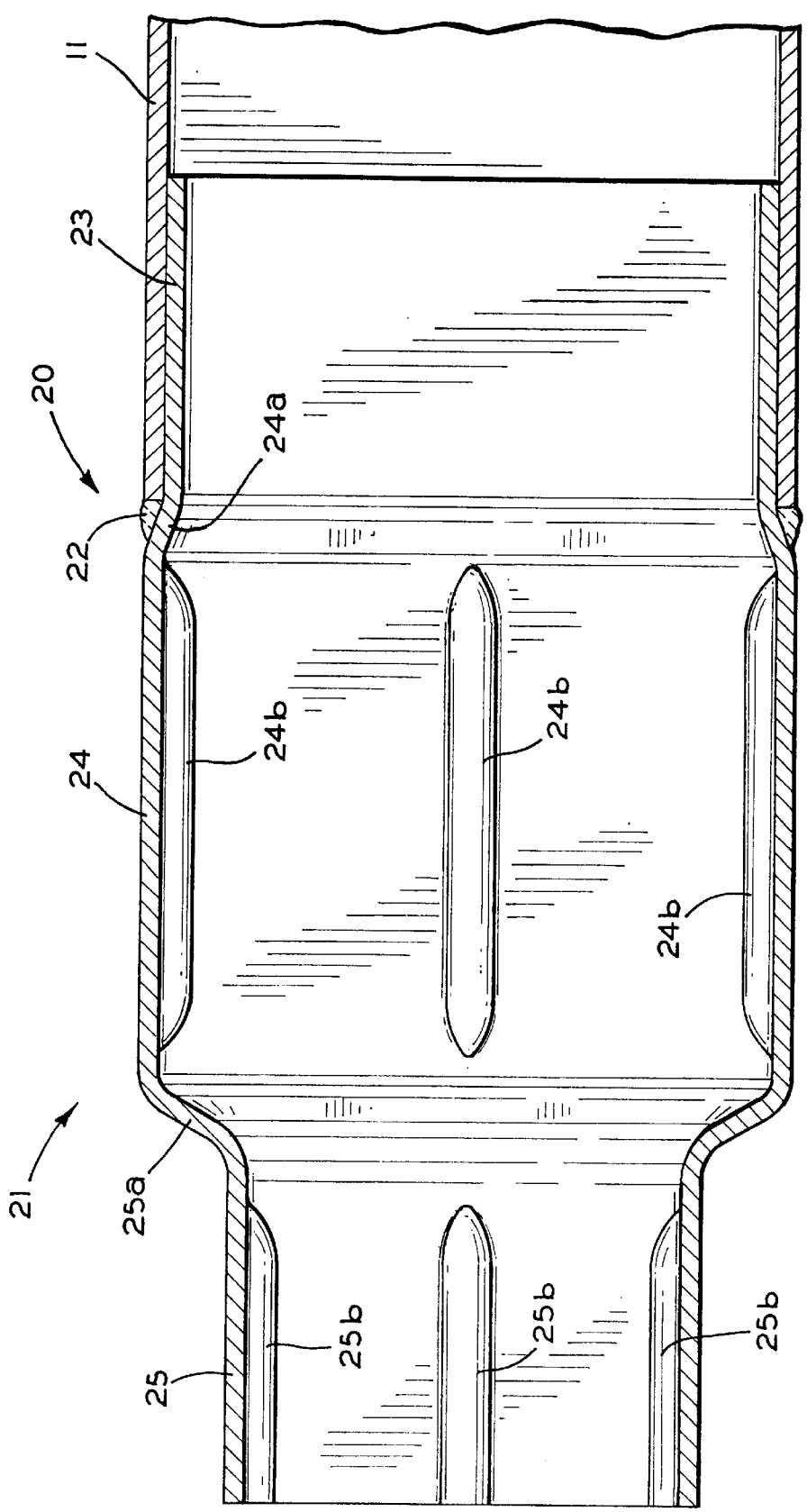
FIG. 2 is an enlarged sectional elevational view of the first embodiment of the energy absorbing structure illustrated in FIG. 1 prior to being axially collapsed.

An energy absorbing structure, indicated generally at 20, is provided at the front end of each of the side rails 11 and 12 of the vehicle body and frame assembly 10. However, it will be appreciated that the energy absorbing structure 20 may be provided at any desired location on the vehicle body and frame assembly 10. The structure of one of the energy absorbing structures 20 is illustrated in FIG. 2. As shown therein, the energy absorbing structure 20 includes a hollow nose cap, indicated generally at 21, that is secured to the front end of the side rail 11 in a conventional manner, such as by one or more welds 22. The illustrated nose cap 21 is formed having a generally rectangular cross sectional shape that corresponds with the cross sectional shape of the front end of the side rail 11. However, the nose cap 21 may be formed having any desired cross sectional shape.

The nose cap 21 includes a first portion 23 that is received telescopically with the front end of the side rail 11. Preferably, the first portion 23 is formed having an outer size that is only slightly smaller than an inner size of the front end of the side rail 11. Thus, the first portion 23 of the nose cap 21 is received snugly within the front end of the side rail 11. In this manner, the first portion 23 of the nose cap 21 can be mechanically supported within the front end of the side rail 11.

The nose cap 21 also includes a second portion 24 that extends from the first portion 23. The second portion 24 of the nose cap 21 is preferably formed integrally with the first portion 23, although such is not necessary. The second portion 24 of the nose cap 21 is preferably formed having an outer size that is larger than the outer size of the first portion 23 so as to define a first shoulder 24a therebetween, although such is not necessary. The first shoulder 24a provides a structure for positively positioning the nose cap 21 relative to the front end of the side rail 11 prior to securement thereto by the welds 22. The second portion 24 of the nose cap 21 is preferably formed having an outer size that is approximately the same as or only slightly smaller that the outer size of the front end of the side rail 11. Thus, the outer surfaces of the nose cap 21 and the front end of the side rail 11 are preferably substantially flush when secured together. If desired, one or more embossed stiffening ribs 24b may be formed in the second portion 24 of the nose cap 21 for a purpose that will be described below.

The nose cap 21 further includes a third portion 25 that extends from the second portion 24. The third portion 25 of the nose cap 21 is preferably formed integrally with the second portion 24, although such is not necessary. The third portion 25 of the nose cap 21 is preferably formed having an outer size that is somewhat smaller than the inner size of the second portion 24 so as to define a second shoulder 25a therebetween. If desired, one or more embossed stiffening ribs 25b may be formed in the third portion 25 of the nose cap 21 for a purpose that will be described below.

FIG. 2 illustrates the energy absorbing structure 20 during normal operation of the vehicle body and frame assembly 10. If the front end of the vehicle frame assembly 10 collides with an object at a relatively low speed, a relatively small force will be exerted against the outermost end of the third portion 25 of the nose cap 21. So long as the magnitude of such a relatively small force is not sufficient to overcome the strength of the second shoulder 25a, then the nose cap 21 will remain substantially as shown in FIG. 2.

Figure 3:
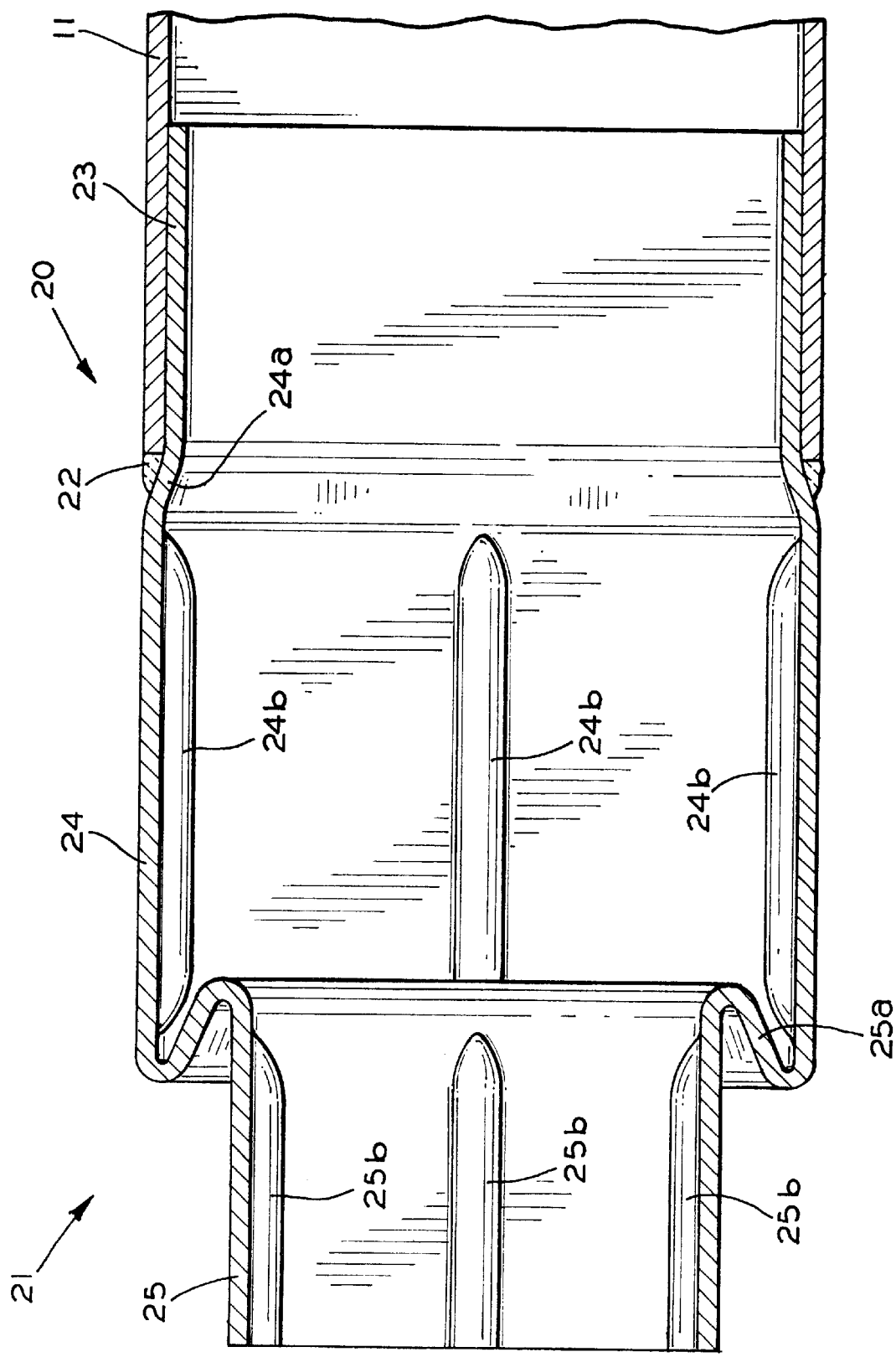
FIG. 3 is an enlarged sectional elevational view similar to FIG. 2 showing the first embodiment of the energy absorbing structure after being axially collapsed.

However, if the front end of the vehicle frame assembly 10 collides with an object at a relatively high speed, a relatively large force will be exerted against the outermost end of the third portion 25 of the nose cap 21. The exertion of such a relatively large force causes the second shoulder 25a to bend, allowing the third portion 25 of the nose cap 21 to move telescopically inwardly relative to the second portion 24, as shown in FIG. 3. Such bending of the second shoulder 25a and concurrent telescopic movement of the third portion 25 within the second portion 24 absorbs energy from the collision. As a result, additional safety is provided to the occupants of the vehicle. The stiffening ribs 24b and 25b provided on the second and third portions 24 and 25 of the nose cap 21 are provided to maintain the second and third portions 24 and 25 in their original shapes during the collision. This is done to facilitate the absorption of energy in a controlled manner during a collision. Because the nose cap 21 is formed as a separate piece from the side rail 11, it can be removed from the side rail 11 with relative ease after a collision and replace with another non-deformed nose cap 21.

Figure 4:
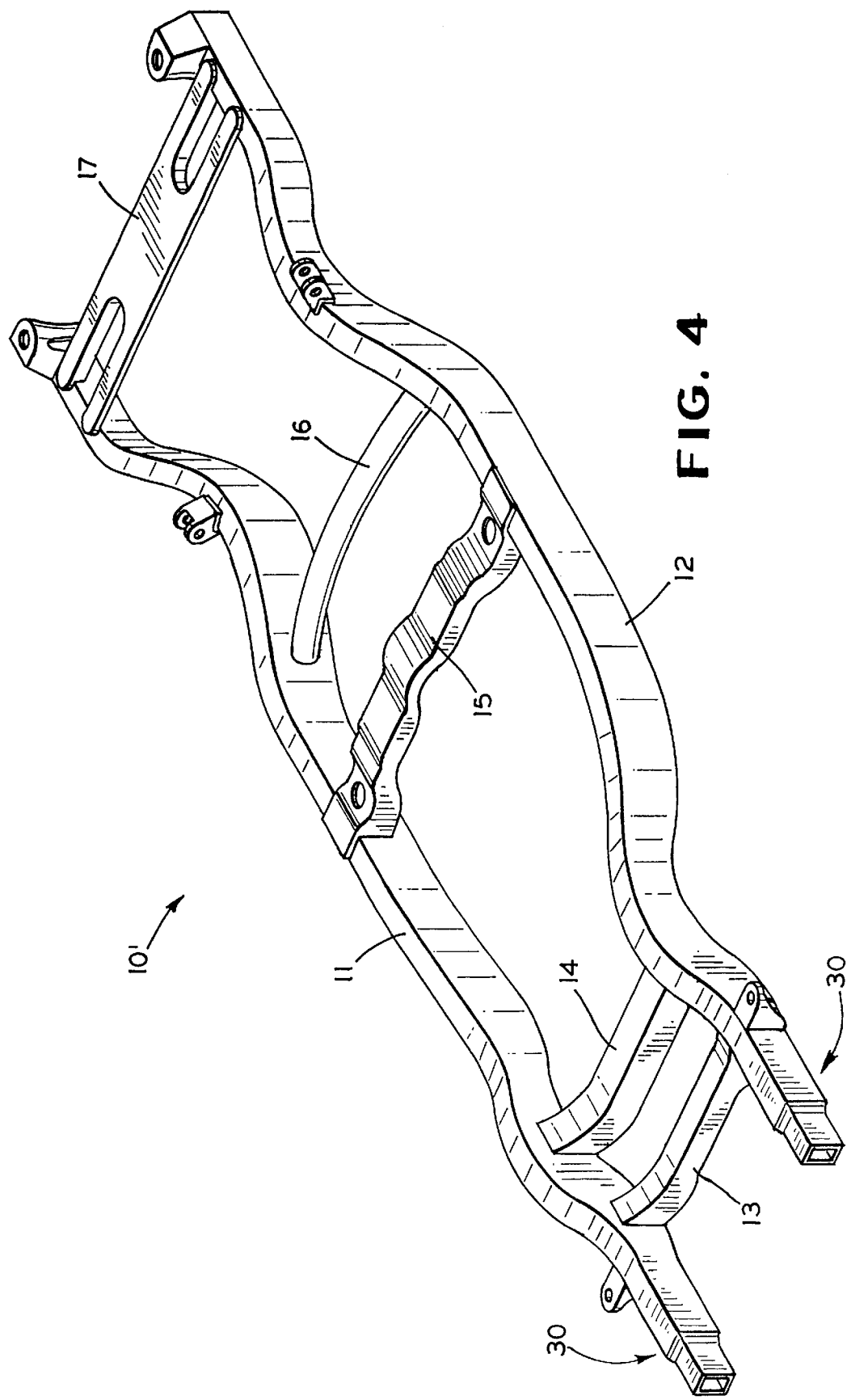
FIG. 4 is a perspective view of a vehicle frame assembly including a second embodiment of an energy absorbing structure in accordance with this invention.
Figure 5:
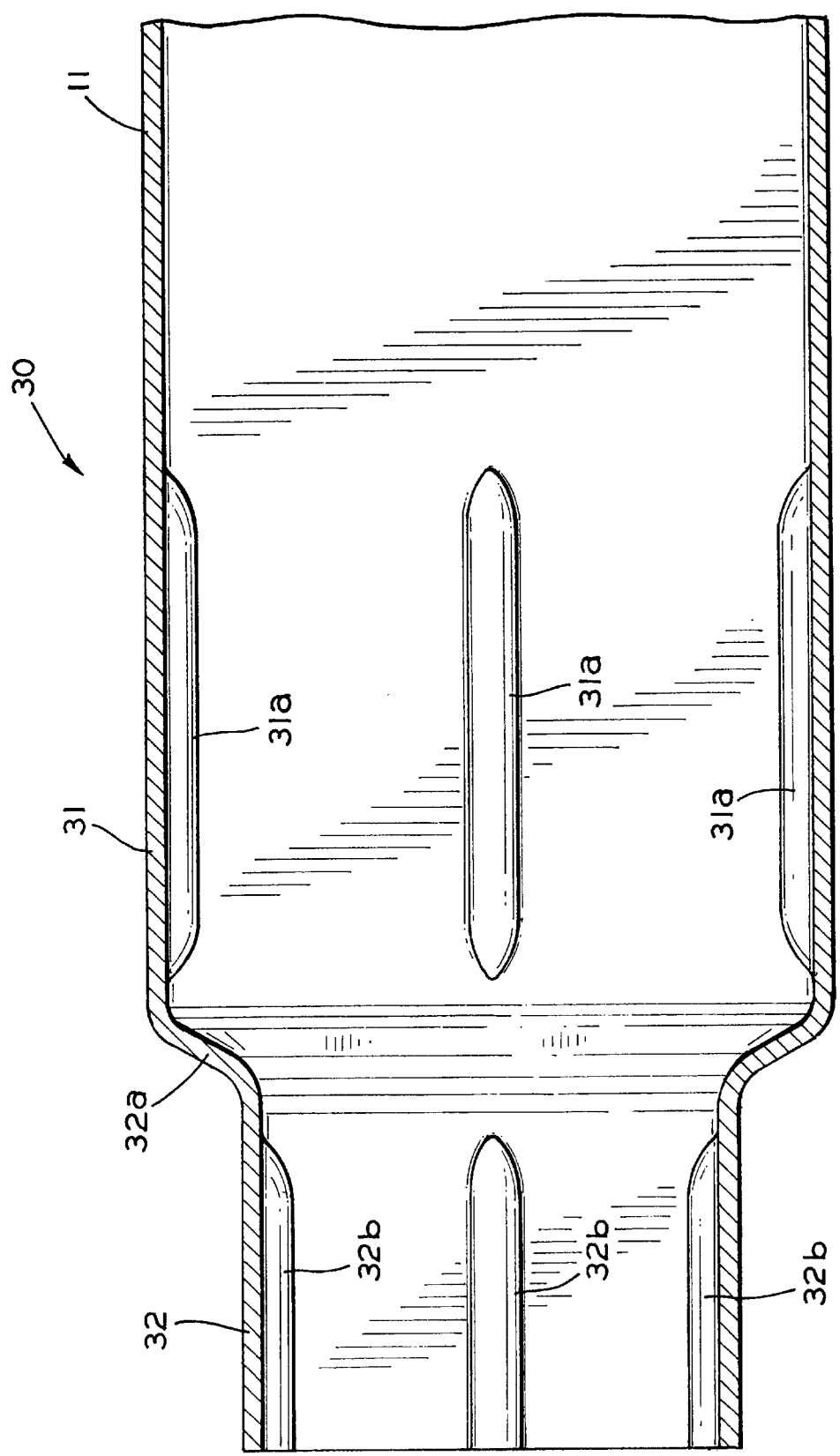
FIG. 5 is an enlarged sectional elevational view of the second embodiment of the energy absorbing structure illustrated in FIG. 5 prior to being axially collapsed.

Referring now to FIGS. 4 and 5, there is illustrated a portion of a second embodiment of a vehicle body frame assembly, indicated generally at 10', in accordance with this invention. The second embodiment of the vehicle frame assembly 10' is generally the same as the first embodiment of the vehicle frame assembly 10 described above, and like reference numbers are used to indicate similar structures. An energy absorbing structure, indicated generally at 30, is provided at the front end of each of the side rails 11 and 12 of the vehicle body and frame assembly 10'. However, it will be appreciated that the energy absorbing structure 30 may be provided at any desired location on the vehicle body and frame assembly 10'. The structure of one of the energy absorbing structures 30 is illustrated in FIG. 5. As shown therein, the energy absorbing structure 30 includes a first portion 31 that is formed integrally with the front end of the side rail 11. The illustrated first portion 31 is formed having a generally rectangular cross sectional shape that corresponds with the cross sectional shape of the front end of the side rail 11. However, the first portion 31 may be formed having any desired cross sectional shape. The energy absorbing structure 30 also includes a second portion 32 that extends from the first portion 31. The second portion 32 is preferably formed integrally with the first portion 31, although such is not necessary. The second portion 32 is preferably formed having an outer size that is somewhat smaller than the inner size of the first portion 31 so as to define a shoulder 32a therebetween. If desired, one or more embossed stiffening ribs 32b may be formed in the second portion 32 of the energy absorbing structure 30. The energy absorbing structure 30 functions in the same manner as the energy absorbing structure 20 discussed above.

Figure 6:
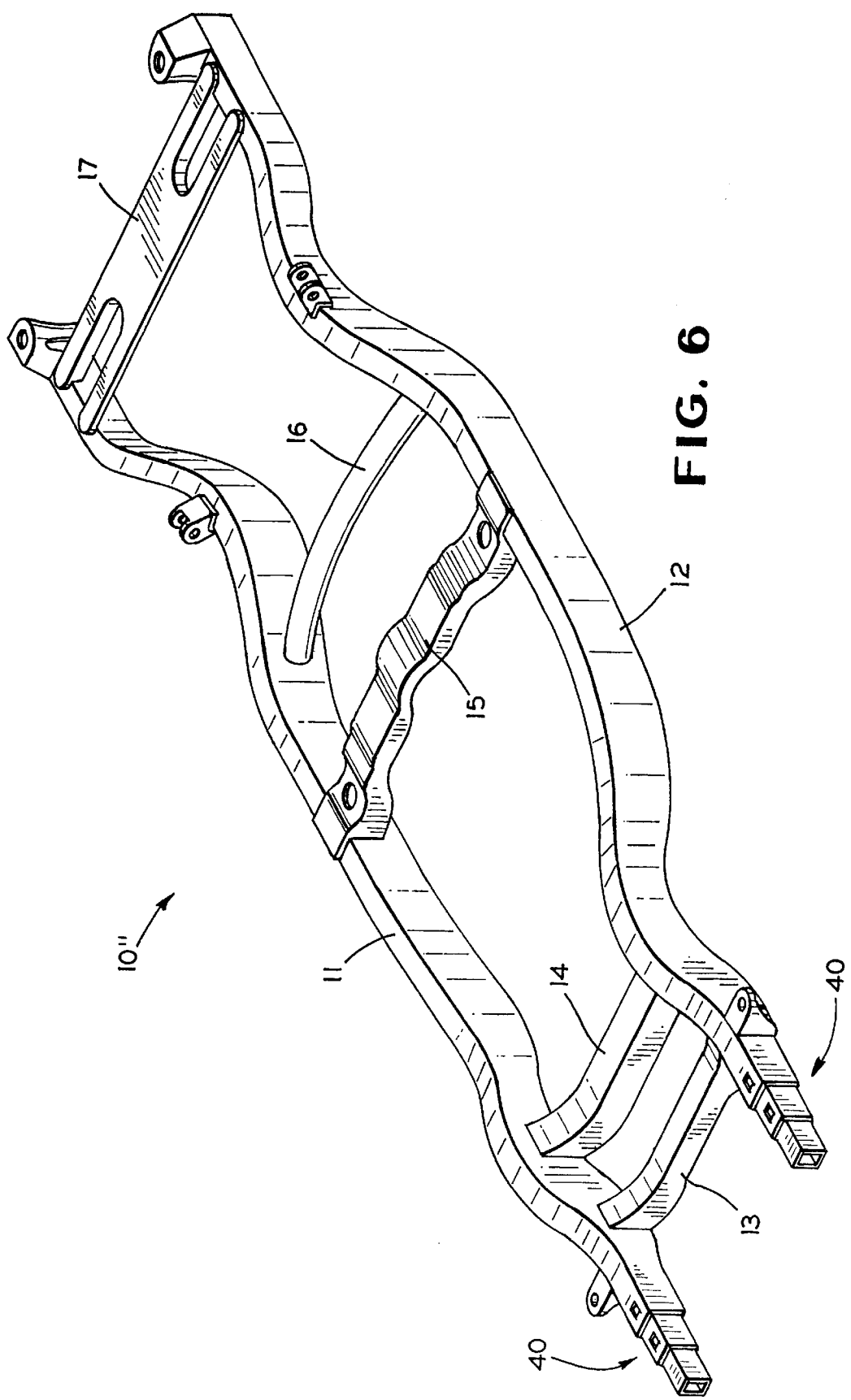
FIG. 6 is a perspective view of a vehicle frame assembly including a third embodiment of an energy absorbing structure in accordance with this invention.
Figure 7:
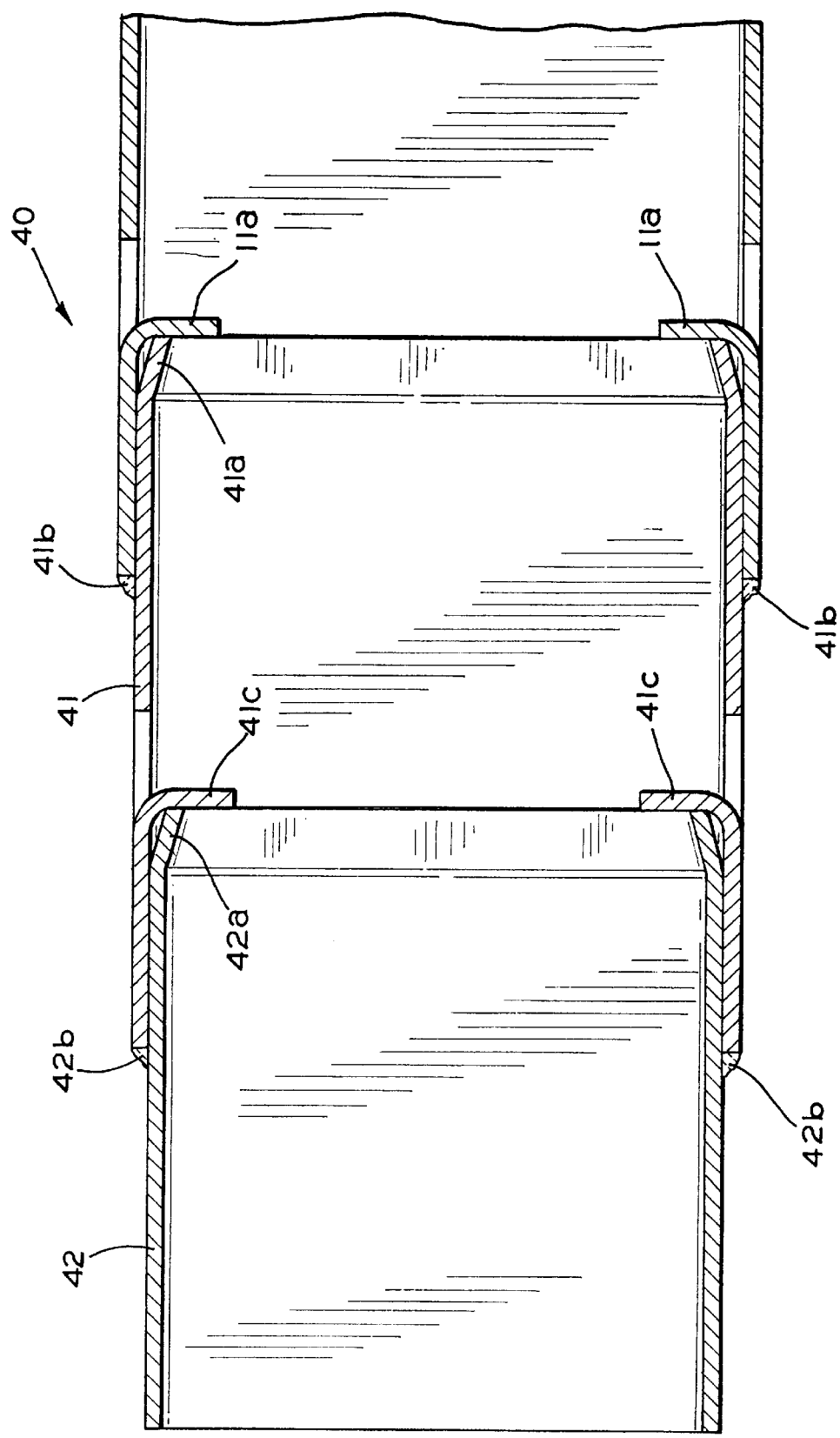
FIG. 7 is an enlarged sectional elevational view of the third embodiment of the energy absorbing structure illustrated in FIG. 7 prior to being axially collapsed.

Referring now to FIGS. 6 and 7, there is illustrated a portion of a third embodiment of a vehicle body frame assembly, indicated generally at 10", in accordance with this invention. The third embodiment of the vehicle frame assembly 10" is generally the same as the first embodiment of the vehicle frame assembly 10 described above, and like reference numbers are used to indicate similar structures.

An energy absorbing structure, indicated generally at 40, is provided at the front end of each of the side rails 11 and 12 of the vehicle body and frame assembly 10. However, it will be appreciated that the energy absorbing structure 40 may be provided at any desired location on the vehicle body and frame assembly 10". The structure of one of the energy absorbing structures 40 is illustrated in FIG. 7. As shown therein, the front end of the side rail 11 has at least one, and preferably a plurality, of tabs 11a formed therein that extend inwardly into the interior thereof. Such tabs 11a can be formed in any conventional manner, such as by punching or cutting and bending. The purpose for such tabs 11a will be explained below.

The energy absorbing structure 40 includes a first hollow member 41 that is secured to the front end of the side rail 11. The illustrated first member 41 is formed having a generally rectangular cross sectional shape that corresponds with the cross sectional shape of the front end of the side rail 11. However, the first member 41 may be formed having any desired cross sectional shape. If desired, an end 41a of the first member 41 may be formed having a frusto-conical or otherwise reduced dimensional shape. The purpose for this reduced dimension end 41a will be explained below. The first member 41 is received telescopically with the front end of the side rail 11 such that the reduced dimension end 41a of the first member 41 abuts the tabs 11a extending within the side rail 11. Preferably, the first member 41 is formed having an outer size that is only slightly smaller than an inner size of the front end of the side rail 11. Thus, the first member 41 is received snugly within the front end of the side rail 11. In this manner, the first member 41 can be mechanically supported within the front end of the side rail 11. The first member 41 can be secured to the front end of the side rail 11 by any conventional means, such as by one or more welds 41b. The front end of the first member 41 has at least one, and preferably a plurality, of tabs 41c formed therein that extend inwardly into the interior thereof. Such tabs 41a can be formed in any conventional manner, such as by punching or cutting and bending. The purpose for such tabs 41a will be explained below.

The energy absorbing structure 40 further includes a second hollow member 42 that is secured to the front end of the first member 41. The illustrated second member 42 is formed having a generally rectangular cross sectional shape that corresponds with the cross sectional shape of the first member 41. However, the second member 42 may be formed having any desired cross sectional shape. If desired, an end 42a of the second member 42 may be formed having a tapered or otherwise reduced dimensional shape. The purpose for this reduced dimension end 42a will be explained below. The second member 42 is received telescopically with the front end of the first member 41 such that the reduced dimension end 42a of the second member 42 abuts the tabs 41c extending within the first member 41. Preferably, the second member 42 is formed having an outer size that is only slightly smaller than an inner size of the first member 41. Thus, the second member 42 is received snugly within the first member 41. In this manner, the second member 42 can be mechanically supported within the front end of the side rail 11. The second member 42 can be secured to the first member 41 by any conventional means, such as by one or more welds 42b.

FIG. 7 illustrates the energy absorbing structure 40 during normal operation of the vehicle body and frame assembly 10". If the front end of the vehicle frame assembly 10" collides with an object at a relatively low speed, a relatively small force will be exerted against the outermost end of the second member 42. So long as the magnitude of such a relatively small force is not sufficient to overcome the strength of the tabs 11a and 41c, then the energy absorbing structure 40 will remain substantially as illustrated in FIG. 7.

However, if the front end of the vehicle frame assembly 10" collides with an object at a relatively high speed, a relatively large force will be exerted against the outermost end of the second member 42. The exertion of such a relatively large force causes the tabs 42c to bend, allowing the second member 42 to move telescopically inwardly relative to the first member 41. Such bending of the tabs 42c and concurrent telescopic movement of the second member 42 within the first member 41 absorbs energy from the collision. In some instances, the exertion of such a relatively large force also causes the tabs 11a to bend, allowing the first member 41 to move telescopically inwardly relative to the front end of the side rail 11. Such bending of the tabs 11a and concurrent telescopic movement of the first member 41 within the front end of the side rail 11 absorbs additional energy from the collision. As a result, additional safety is provided to the occupants of the vehicle.

Because the first and second members 41 and 42 are formed as separate pieces from the side rail 11, they can be removed from the side rail 11 with relative ease after a collision and replace with another non-deformed nose cap 21. Furthermore, it will be appreciated that the energy absorbing device 40 may include only one such member or three or more of such members if desired. Although not illustrated in FIGS. 6 and 7, either or both of the first and second members 41 and 42 may be formed having stiffening ribs for the same purpose as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle frame assembly comprising:
    a plurality of structural members that are connected together to form a vehicle frame assembly, at least one of said structural members having a hollow portion; and
    an energy absorbing structure secured to said hollow portion of said one of said structural members, said energy absorbing structure including:
        a first portion having a first generally uniform dimension, said first portion extending within said hollow portion of said one of said structural members;
        a second portion extending from said first portion and having a second generally uniform dimension that is greater than said first generally uniform dimension of said first portion so as to define a first shoulder between said first portion and said second portion that abuts said hollow portion of said one of said structural members; and
        a third portion extending from said second portion and having a third generally uniform dimension that is less than said first generally uniform dimension of said first portion so as to define a second shoulder between said second portion and said third portion; wherein said second portion has at least one stiffening rib formed therein and said third portion has at least one stiffening rib formed therein that is discontinuous with said stiffening rib formed in said second portion;
    said energy absorbing structure adapted to be deformed during a collision such that said third portion is moved within said second portion to absorb energy.

2. The vehicle frame assembly defined in claim 1 wherein said one of said structural members and said energy absorbing structure are formed from metallic materials.

3. The vehicle frame assembly defined in claim 2 wherein said one of said structural members and said energy absorbing structure are secured together by welding.

4. The vehicle frame assembly defined in claim 1 wherein said second portion has a plurality of stiffening ribs formed therein.

5. The vehicle frame assembly defined in claim 1 wherein said third portion has a plurality of stiffening ribs formed therein.

6. The vehicle frame assembly defined in claim 1 wherein said second portion has a plurality of stiffening ribs formed therein, and wherein said third portion has a plurality of stiffening ribs formed therein.

7. The vehicle frame assembly defined in claim 1 wherein a plurality of said structural members have respective hollow portions, and wherein an energy absorbing structure is secured to each of said hollow portions of said structural members.

* * * * *